United States Patent [19]
Saylor

[11] 4,355,598
[45] Oct. 26, 1982

[54] ANIMAL FEEDER WITH AUTOMATIC DISPENSER

[76] Inventor: Dana H. Saylor, 1572 Renderer, Warson Woods, Mo. 63122

[21] Appl. No.: 233,902

[22] Filed: Feb. 12, 1981

[51] Int. Cl.³ .............................................. A01K 5/00
[52] U.S. Cl. ................................. 119/52 A; 119/54
[58] Field of Search ............... 119/52 R, 52 A, 51.12, 119/53.5, 54

[56] References Cited

U.S. PATENT DOCUMENTS

| | | | |
|---|---|---|---|
| 633,693 | 9/1899 | Hachmann | 119/54 |
| 796,301 | 8/1905 | Devine | 119/52 R |
| 979,026 | 12/1910 | Newman | 119/53.5 |
| 1,505,157 | 8/1924 | Markey | 119/54 |
| 1,506,079 | 8/1924 | Pence | 119/52 A |
| 1,695,597 | 12/1928 | Lydon | 119/52 A |
| 1,832,999 | 11/1931 | Rummell | 119/52 R |
| 2,153,455 | 4/1939 | Casper et al. | 119/52 A X |
| 2,503,886 | 4/1950 | Olson | 119/53.5 |
| 2,544,578 | 3/1951 | Winkler | 119/54 |
| 2,640,464 | 6/1953 | Jindrich | 119/54 |
| 2,699,146 | 1/1955 | Rogers | 119/54 |
| 2,773,474 | 12/1956 | Dodds | 119/55 |
| 2,830,557 | 4/1958 | Frush | 119/54 |
| 3,033,164 | 5/1962 | Evers | 119/54 |
| 3,040,707 | 6/1962 | Shrimplin | 119/53.5 |
| 3,074,377 | 1/1963 | Spencer | 119/54 |
| 3,780,701 | 12/1973 | Wentworth, Sr. | 119/51 R |
| 3,812,823 | 5/1974 | Ridder et al. | 119/54 |
| 3,850,145 | 11/1974 | Yoder et al. | 119/51 R |
| 3,952,705 | 4/1976 | Witmer et al. | 119/51 R |
| 4,034,715 | 7/1977 | Arner | 119/52 R X |
| 4,040,389 | 8/1977 | Walters | 119/52 R |
| 4,180,014 | 12/1979 | Mathews | 119/52 R |
| 4,196,697 | 4/1980 | Poiesz | 119/51 R |

FOREIGN PATENT DOCUMENTS 416821 9/1934 United Kingdom ............... 119/53.5

Primary Examiner—Gene Mancene
Assistant Examiner—Robert P. Swiatek
Attorney, Agent, or Firm—Hill, Van Santen, Steadman, Chiara & Simpson

[57] ABSTRACT

An improved hog feeder with automatic dispensing mechanisms comprising a hopper which is attached to a bottom crate portion of the feeder which is formed with one or more conical recesses into which the hog or other animal may insert his head so as to feed and which includes an annular agitator device which fits between the bottom open end of the conical member and the bottom of the tray portion of the feeder such that as the animal moves the agitator with his nose as he eats feed will be supplied from the storage bin. The feeder provides automatic dispensing of the feed as well as restricts the lateral head movement of the animal which prevents wasting of feed.

8 Claims, 6 Drawing Figures

ANIMAL FEEDER WITH AUTOMATIC DISPENSER

BACKGROUND OF THE INVENTION

1. Field of the Invention

This invention relates in general to animal feeders and in particular to an improved automatic supply feeder which results in very little waste of feed by the animal.

2. Description of the Prior Art

There are numerous livestock feeding mechanisms wherein the animal by inserting his head into a feed stall causes the release of feed. U.S. Pat. No. 2,153,455 discloses a feeder which has a rotary member which can be engaged by the nose of the animal to cause feed to be dispensed.

Other arrangements are known wherein the animal causes tilting of a feed pan so as to dispense the feed and examples of such structures are shown in U.S. Pat. No. 2,830,557 and U.S. Pat. No. 2,773,474. Other arrangements are known wherein feed is dispensed by the insertion of the animal's head into the feeder. Such arrangements are shown in U.S. Pat. No. 3,033,164 and U.S. Pat. No. 3,850,145.

SUMMARY OF THE INVENTION

The present invention comprises an animal feeder as, for example, for a hog which has an upper bin and a bottom feed pan which is shaped to a contour which forms a bowl in the feeding area that induces the flow of feed from the hopper so that it can be readily eaten by animals. The bottom feed pan is formed with openings into which one or more truncated cones are mounted into which the nose of the animals can be inserted. The cones restrict the lateral head movement which substantially reduces wasting of the feed by the animal and also serves as a vertical movement control for feed agitator rings which are mounted at the bottom of each of the cone members between the bottom of the feed pan and the cone member. The feed agitators may be made of wire and are circular in shape and have portions which engage both the outer and inner edges of the cone and include spacers which retain it a fixed distance from the bottom of the feed pan such that as the agitator is rotated by the animal's head fingers on the agitator which ride on the shoulders of the dish area of the bottom of the feed trough will move feed from the hopper in the rear of the device into the bowl feeding area. The agitator rings include means which prevent the animal from forcing the agitator beneath the lower edge of the cone which would cause it to bind so that it no longer functions. The feeder of the invention is constructed of metal and plastic such that it can be readily assembled, has long life, can be easily cleaned and in which the plastic provides for improved feed flow. Although the particular embodiment illustrated herein comprises a feeder with three feed dispensing cones, the invention can be constructed with a smaller or larger number of cones in a first dispensing area and can also be constructed with a hopper which feeds into cones that extend on both sides of the hopper so that animals can feed on both sides of the device.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which:

DESCRIPTION OF THE PREFERRED EMBODIMENTS

Figure 3:
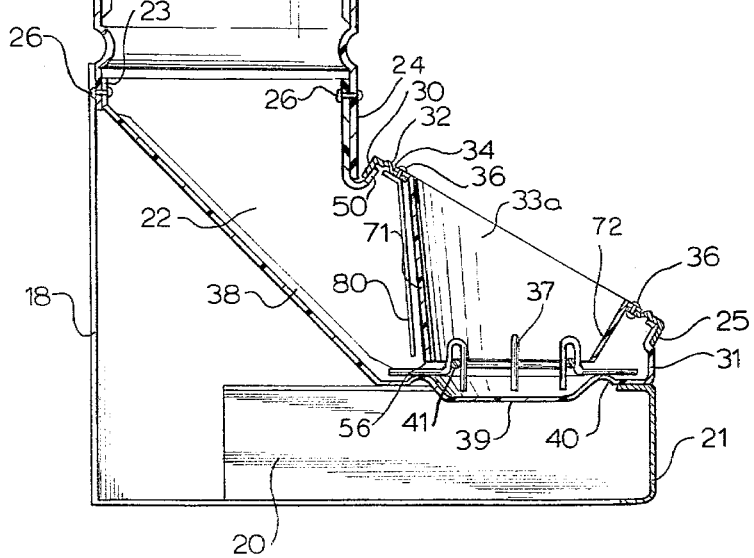
FIG. 3 is a sectional view taken on line III—III in FIG. 2.

The Figures illustrate the animal feeder of the invention in one form wherein the feeder 10 has a generally rectangular-shaped hopper 11 which may be formed of a suitable plastic and which has an upper lip 12. A reinforcing bar 13 is mounted adjacent the lip 12 by suitable rivets 14 as shown in FIG. 3, for example. Feed may be poured into the opening 16 of the hopper between the front and back wall 17 and its lower end 24 fits over an upper collar 23 of a plastic feed pan member 22. The members 11 and 22 are connected by suitable rivets 26. Various depressions 20 may be formed in the walls of the hopper 11 so as to strengthen it.

Figure 4:
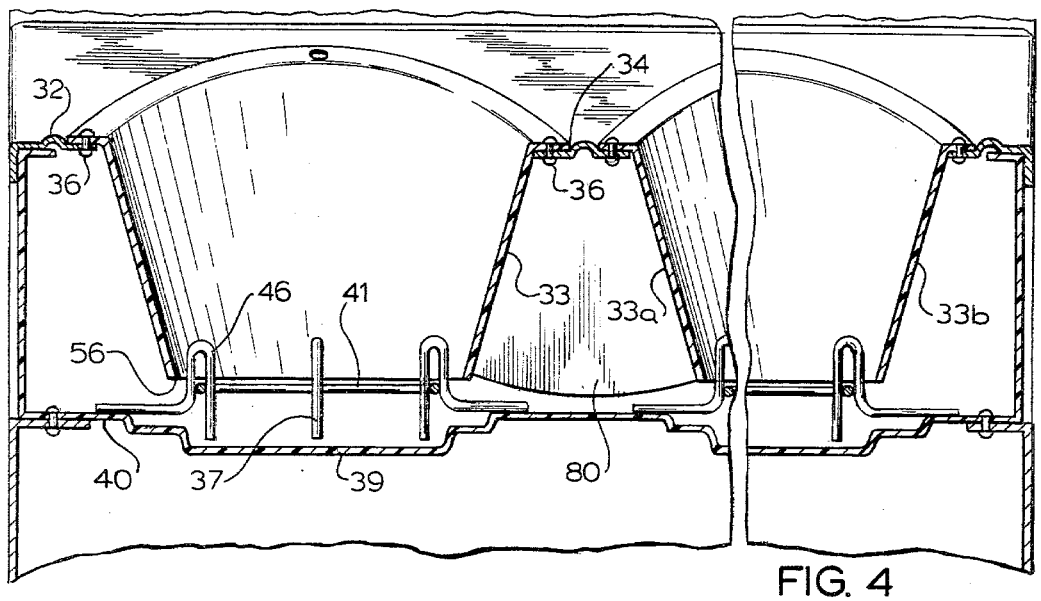
FIG. 4 is a detail sectional view through one of the cone shape feeders on line IV—IV in FIG. 2.

The feed pan has a generally sloping bottom wall 38 which connects with a bottom portion 40 as shown in FIGS. 3 and 4 and circular depressions 39 are formed beneath each of the feed dispensing areas. The top of the dispensing pan 22 is formed with a ledge 50 adjacent the lower end of the front wall and a front ridge 31 adjacent the front of the feeder tray 22. A generally rectangular cover plate 32 of stainless steel for example, has downwardly extending ledges 25 and 30 which fit over and engage the portions 50 and 31 of the feeder pan 22 and suitable holding means such as rivets or bolts lock the cover plate 32 to the feeder pan 22 as shown, for example, in FIG. 1. The cover 32 is formed with a plurality of openings in which are mounted conical shaped members 33, 33a and 33b to serve as the feed openings into which the nose of the animal can be inserted while he is eating. The cone may be formed of a high density polyethylene plastic which is smooth and relatively slippery so that the feed will not stick to it. The cones 33, 33a and 33b are attached to the metal cover member 32 by rivets 36 as shown in FIG. 3, for example. It is to be noted that the front wall portion 72 of the conical members 33, 33a and 33b is substantially lower than the rear wall 71 of the conical members.

Figure 1:
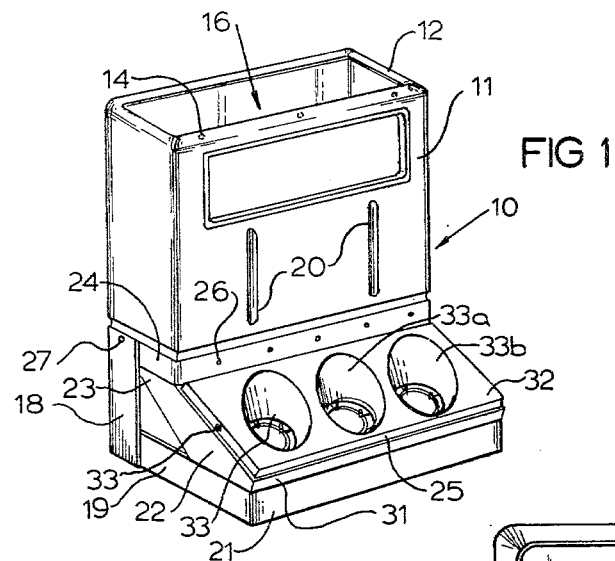
FIG. 1 comprises a perspective view of the feeder of the invention.
Figure 2:
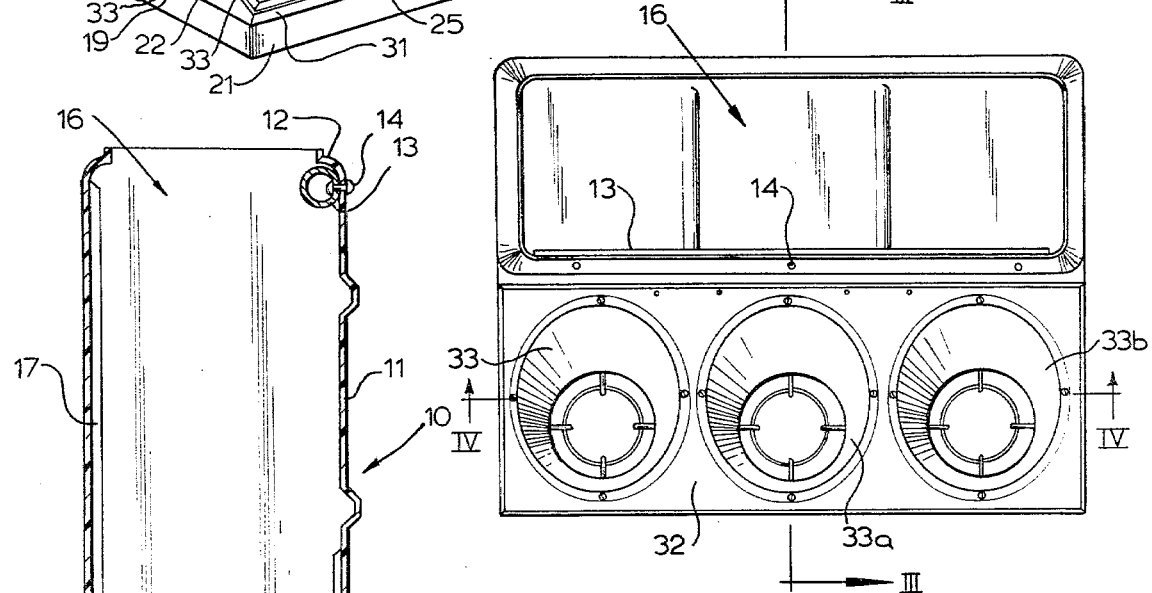
FIG. 2 is a top plan view of the invention.

A lower support member 18 may be made of stainless steel, for example, and comprises bottom rim portions 19 and 20 which extend along the lower sides of the feeder and a pair of upright angle members and a front rim member 21 as shown in FIGS. 1 and 3.

Figure 6:
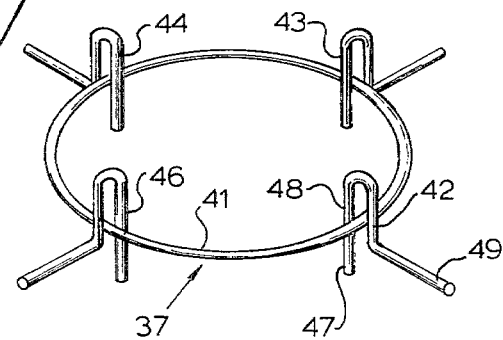
FIG. 6 is a perspective view of one of the agitators.

Mounted in the lower ends 56 of each of the cone shape members 33, 33a and 33b is an agitator member 37 such as shown in detail in FIG. 6. The agitator member rides in the depression 39 formed in the bottom 40 of the feed pan 22 between the lower end 56 of the conical members so that it can be moved by the animal to agitate the feed so as to cause feed to be removed and supplied into the conical portion 33 where it can be eaten by the animal.

Figure 5:
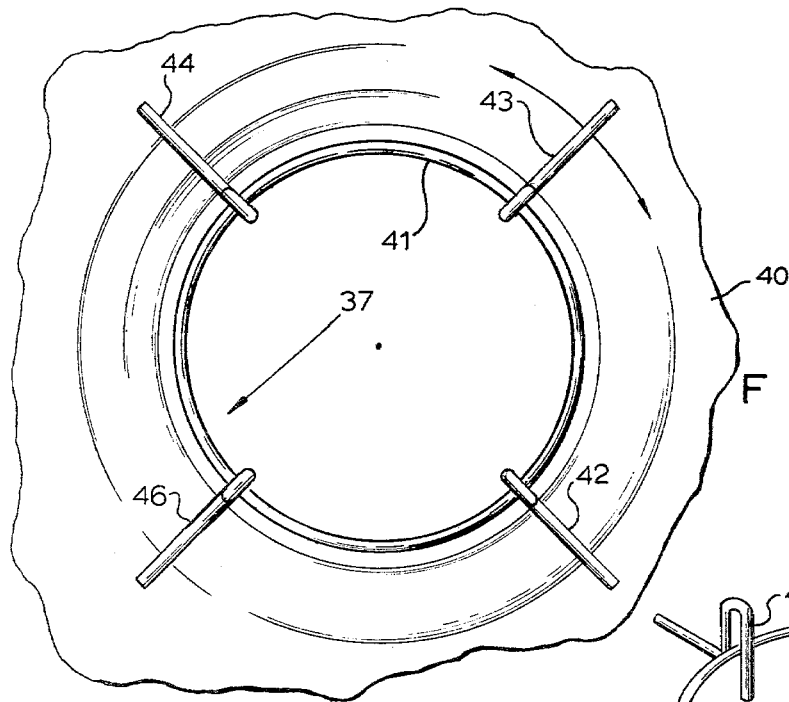
FIG. 5 is an enlarged top plan view of one of the agitators.

As shown in FIGS. 4, 5 and 6, one form of the agitator may comprise a ring 41 to which are attached a plurality of agitating and spacer members 42, 43, 44 and 46 which might be equally spaced about the ring 41, for example, as shown in FIG. 6. Each of the agitator members 42 through 46 comprises a downwardly extending portion 47 which engages the bottom 40 in the depression 39 which aids in holding the retainer 37 aligned with the opening in the conically shaped member 33. Then the agitator members 42 through 46 have upwardly extending portions 48 which are formed in the shape of an inverted U and are of a size so that they engage the inner lips of the openings at the lower ends of the conically shaped members 33 so as to hold the rings within the openings at the lower end of the conically shaped members 33. Also, since these members 48 are smooth and have no sharp edges, they cannot injure the tongue or other portions of the animal in use. Outwardly extending members 49 extend from the portions 48 of each of the agitator members 42 through 46 and these extend beyond the lower ends 56 of the conically shaped members 33 so as to hold the agitator members in place and the extending portions 49 also engage feed that has passed from the hopper 11 onto the feed pan 22 and move it into the opening beneath the conical members 33 so that the animal can eat it.

In operation, feed is placed into the hopper 11 through the opening 16 and it passes down through the feed pan 22 until it engages the conically shaped member 33. When an animal desires to eat, he inserts his nose into the conically shaped member 33 and as he eats he rotates the agitator member 37 such that it moves in oscillatory or rotary motion which results in the portions 49 of the agitator members 42 through 46 engaging and bringing in additional feed into the opening between the conically shaped members 33. Due to the configuration and arrangement of the conically shaped members 33 and the agitator 37, feed will not spill from the feeder and be wasted and only sufficient feed will be available in each of the conically shaped members 33 for the animal's requirements.

The advantages of the feeder are that the cone shaped members 33 restrict the lateral head movement of the animal which prevents the feed being wasted and the cone also serves as a vertical movement control for the feed agitator members 37. The circular feed wire agitator 37 which may be made of metal wire rides in the dish area 39 at the bottom of the feed trough to actually move feed by the fingers 49 from the hopper into the bowl feeding area. Looping the wire of the members 42, 43, 44 and 46 over the ring 41 as shown in FIG. 6, prevents the agitator from being forced beneath the edge 56 of the cone 33 which would cause it to bind and no longer function. The cover plate 32 is secured by screws or bolts on either end of the plate which allows easy removal for cleaning purposes.

Feed diverters 80 are attached to the underside of the plate 32 between the cones 33, 33a and 33b to prevent feed from building up in these areas which could cause the agitators to bind and become immobile.

The use of stainless steel and plastic results in a feeder of high quality in that the possibility of corrosion is substantially eliminated. Furthermore, the corners and contour of the feeder are such that feed flow is assisted, feed hangups are minimized and cleaning is simplified. Also, the absence of sharp corners eliminates injury to animals by coming into contact with the feeder.

Although the invention has been described with respect to swine feeders, it is to be realized it can be utilized for any type of animals and although the feeder is illustrated as a three station feeder formed on one side of the hopper 11 it is to be realized it can be made in the form of a double sided feeder which has feeding bowls on both sides of the hopper which will be fed by a single large hopper. Other forms, of course, can be envisioned.

Although the invention has been described with respect to preferred embodiments, it is not to be so limited as changes and modifications can be made which are within the full intended scope of the invention as defined by the appended claims.

I claim as my invention:

1. An animal feeder comprising, a hopper, a feed pan member attached to the lower end of said hopper and having a first floor portion which extends downwardly from said hopper and a substantially horizontal second floor portion which joins said first floor portion, a cover member attached to said feed pan member, an inverted conically-shaped animal mouth receptacle formed in said cover member and formed with a lower open end which is spaced from said second floor portion of said feed pan member, and a ring shaped agitator mounted in the lower end of said conically-shaped member for movement in the horizontal plane and having feeder fingers which extend beyond the lower end of said conically-shaped member to engage feed and move it into said opening wherein said agitator has a plurality of substantially vertical members with lower portions engageable with said second floor portion and having upper portions which extend up into said opening in the lower end of said conically-shaped receptacle and including a depression formed in said second floor portion under said conically-shaped receptacle into which said lower portions of said agitator are received to hold the agitator in position.

2. An animal feeder according to claim 1 wherein said agitator and said vertical members are formed so as to have no rough edges to prevent injury to animals while feeding.

3. An animal feeder according to claim 1 including a reinforcing bar attached to said hopper to reinforce it.

4. An animal feeder according to claim 1 including reinforcing ribs formed in said hopper.

5. An animal feeder according to claim 1 wherein said cover member slopes downwardly from said hopper so that the edge of said conically-shaped receptacle closest to said hopper is higher than the edge furthest from said hopper.

6. An animal feeder according to claim 5 including a plurality of conically-shaped receptacles formed in said cover member and a plurality of agitators between the lower ends of said receptacles and said second floor portion of said feed pan member.

7. An animal feeder according to claim 6 including deflector plates mounted between adjacent conically-shaped receptacles so that feed will be directed to the lower ends of said conically-shaped receptacles and will not build up between them.

8. An animal feeder according to claim 5 wherein the inverted conically-shaped receptacle has an axis which defines its height which extends in the substantially vertical direction and the upper end of said member is truncated and the lower end is cut on a substantially horizontal plane.

* * * * *